United States Patent
Bartels et al.

(10) Patent No.: US 10,872,396 B2
(45) Date of Patent: Dec. 22, 2020

(54) IMAGE STITCHING METHOD AND DEVICE

(71) Applicant: Cyclomedia Technology B.V., Zaltbommel (NL)

(72) Inventors: Christian Leonard Lucien Bartels, Eindhoven (NL); Bart Johannes Beers, Rumpt (NL)

(73) Assignee: CycloMedia Technology B.V., Zaltbommel (NL)

( * ) Notice: Subject to any disclaimer, the term of this patent is extended or adjusted under 35 U.S.C. 154(b) by 176 days.

(21) Appl. No.: 16/094,640

(22) PCT Filed: Apr. 24, 2017

(86) PCT No.: PCT/NL2017/050261
§ 371 (c)(1),
(2) Date: Oct. 18, 2018

(87) PCT Pub. No.: WO2017/183985
PCT Pub. Date: Oct. 26, 2017

(65) Prior Publication Data
US 2019/0108615 A1  Apr. 11, 2019

(30) Foreign Application Priority Data
Apr. 22, 2016 (NL) ................................ 2016660

(51) Int. Cl.
*G06T 3/40* (2006.01)
*G06T 7/30* (2017.01)
*G06T 5/50* (2006.01)

(52) U.S. Cl.
CPC .............. *G06T 3/4038* (2013.01); *G06T 5/50* (2013.01); *G06T 7/30* (2017.01); *G06T 2207/20221* (2013.01)

(58) Field of Classification Search
CPC .......... G06T 3/4038; G06T 7/30; G06T 5/50; G06T 2207/20221
(Continued)

(56) References Cited

U.S. PATENT DOCUMENTS 5,986,668 A   11/1999  Szeliski et al.
6,097,854 A    8/2000  Szeliski et al.
(Continued)

OTHER PUBLICATIONS

Lhuillier et al., "Relief mosaics by joint view triangulation," Proceedings of the IEEE conference on computer vision and pattern recognition, part 1, Dec. 8, 2001, pp. 785-790, vol. 1, ISBN: 978-0-7695, IEEE Computer Society, Los Alamitos, CA.

*Primary Examiner* — Ayodeji O Ayotunde
(74) *Attorney, Agent, or Firm* — The Webb Law Firm (57) ABSTRACT

The present invention is related to an image stitching method. It is further related to an image stitching device and to a computer readable medium carrying instructions for performing such method. The method according to the invention includes determining a pixel value of a pixel at an interpolation position in the region to be stitched using pixel values of corresponding pixels in a plurality of sub-images. According to the invention, the interpolation position corresponds to a weighted sum of positions of the corresponding pixels. The weighting factor for the position of a corresponding pixel in a given sub-image depends on a relative distance of at said interpolation position to a border of the region to be stitched associated with that sub-image.

25 Claims, 10 Drawing Sheets

(58) Field of Classification Search
USPC .......................................................... 382/284
See application file for complete search history.

(56) References Cited

U.S. PATENT DOCUMENTS

| | | | |
|---|---|---|---|
| 7,006,709 B2 | 2/2006 | Kang et al. | |
| 8,233,741 B1* | 7/2012 | Wilson | G06T 5/006 382/100 |
| 2010/0054628 A1* | 3/2010 | Levy | G06T 3/4038 382/284 |
| 2014/0307045 A1 | 10/2014 | Richardt et al. | |
| 2016/0028950 A1 | 1/2016 | Perazzi et al. | |
| 2016/0277723 A1* | 9/2016 | Lee | G01B 11/2441 |

\* cited by examiner

IMAGE STITCHING METHOD AND DEVICE

CROSS-REFERENCE TO RELATED APPLICATIONS

This application is the United States national phase of International Application No. PCT/NL2017/050261 filed Apr. 24, 2017, and claims priority to Dutch Patent Application No. 2016660 filed Apr. 22, 2016, the disclosures of which are hereby incorporated in their entirety by reference.

BACKGROUND OF THE INVENTION

Field of the Invention

The present invention is related to an image stitching method. It is further related to an image stitching device and to a computer readable medium carrying instructions for performing such method.

Description of Related Art

Methods are known in the art by which multiple images each covering a different part of a scene can be combined into one panoramic image. The angle of view of such image may reach up to 360 degrees, giving a user a full impression of the surroundings of a given viewpoint. For instance, applications are known wherein vehicle-mounted cameras are used to obtain information of the surroundings. Such information can be used in e.g. surveying and measurement tasks, remote work-planning and (public) asset management. Other applications of for instance sequential panoramic images or video include entertainment, e.g. 360 degree content for virtual reality viewing devices. Typically, a plurality of cameras is used, wherein the cameras are each directed in a different direction. The images obtained by these cameras must be combined into a panoramic image. This process comprises image stitching.

When creating a high-quality seamless panoramic image from multiple sub-images, one typically aims to minimize parallax errors. This improves the geometrical correctness of the result and reduces the visibility of stitching artefacts such as seams or ghosting. Parallax errors can be minimized by keeping the optical centre of the camera(s) recording the images on the same spatial position. In practice however, this is prevented by inaccurate alignment, e.g. when manually capturing without a tripod and panoramic rotator, physical restrictions, e.g. in getting the optical centre of multiple cameras to align, or multi-perspective requirements, e.g. some parallax may be required to construct a depth map or stereo views. To improve the quality of the panoramic image when (residual) parallax is present, algorithms are needed that minimize the visibility of artefacts.

Figure 1:
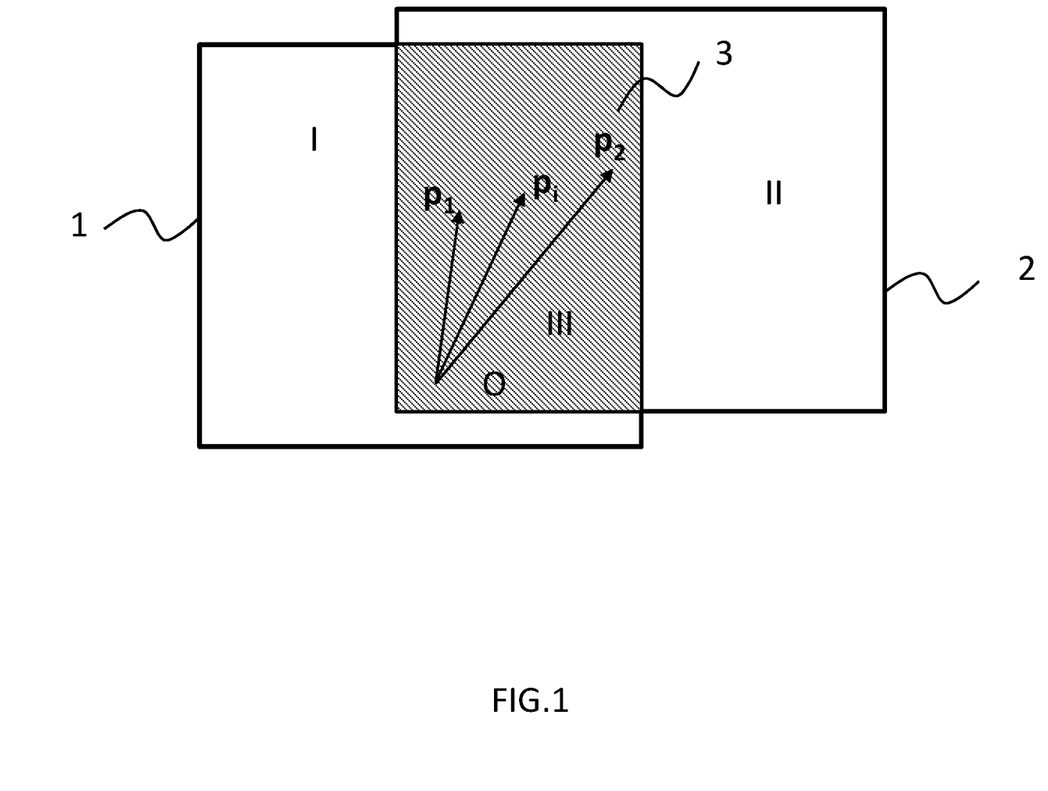
FIG. 1 illustrates the problem of image stitching.

FIG. 1 illustrates the general stitching problem of combining two images 1, 2 into a single image. Hereinafter, the images that are to be stitched are referred to as sub-images, wherein the result of the stitching, e.g. the panoramic image, is referred to as final image.

Sub-images 1, 2 have been globally aligned and overlap in an overlapping region 3. After global alignment, the sub-images are normally no longer rotated or shifted with respect to each other when using these images to construct the final image. Global alignment is known in the art and comprises finding a suitable relative position and orientation of the sub-images based on corresponding features in the sub-images. Alternatively, the positioning or orientation can be determined using the geometrical relationship between the cameras responsible for obtaining the cameras or between the entrance pupils of those cameras or camera at the time of recording the sub-images.

Due to the global alignment, a reference frame can be introduced by means of which positions in the sub-images and final image can be expressed as vectors relative to a common origin O.

The final image has a shape that may correspond to the sum of the contours of sub-images 1, 2. To determine the content of this final image, three regions can be identified. In the first region I, the pixels of the final image are determined using pixels of only sub-image 1. In the second region II, the pixels of the final image are determined using pixels of only sub-image 2. In the third region III, the pixels of the final image are determined using pixels of both sub-image 1 and sub-image 2. This latter region, hereinafter referred to as the region to be stitched, may correspond to the overlapping region 3, but it may also be smaller or larger than this region.

In FIG. 1, vectors $p_1$ and $p_2$ indicate positions of corresponding pixels in sub-images 1 and 2, respectively. For instance, these vectors point to pixels that represent or are part of the same feature in both sub-images. Accordingly, these vectors point to pixels in the respective sub-images that are associated with features that appear in both sub-images. In case when parallax is absent, vector $p_1$ and vector $p_2$ should ideally coincide. It is noted that both vector $p_1$ and vector $p_2$ relate to a common origin denoted by O, and may refer to pixels that are outside of the overlapping region and/or region to be stitched.

Corresponding pixels in two or more sub-images can be found using techniques that are known in the art, such as optical flow, motion estimation, and/or (dense) (stereo) matching. In most techniques, not only the pixels themselves but also the surrounding pixels are examined to determine whether a pair or combination of pixels is found to constitute a pair or group of corresponding pixels.

The stitching problem can be summarized as how to determine the pixel values for the pixels in the region to be stitched, e.g. region III in FIG. 1. For instance, in FIG. 1 the pixel value of the pixel at a position corresponding to vector $p_i$ needs to be determined using the information from sub-images 1 and 2. In such case it is important to determine a) which pixels in sub-images 1, 2 should be used to determine the value of the pixel at $p_i$, and b) if these pixels are known, how the pixel value at position $p_i$ is determined using the pixel values of these pixels.

A known technique for addressing this problem is known as alpha blending. In this technique the value of the pixel at position $p_i$ in the final image is determined using the pixel values at this same position in sub-images 1 and 2, i.e. $p_i = p_1 = p_2$. A weighting factor may be used to impart more or less weight to a particular pixel value of a pixel in a given sub-image. A drawback of this known approach is that ghosting may occur in the final image.

In U.S. Pat. Nos. 5,986,668A and 6,097,854A a local alignment step is described as a de-ghosting method in which pairwise correspondences are used to calculate a warping to a (virtual) average position. This known method can handle n overlapping input images, warping each image to the same average interpolation position, which removes the ghosting in the overlap region. However, as the overlap region is warped to an average interpolation position and the non-overlapping parts are not warped, this approach can yield visual artefacts on this boundary.

Further methods for stitching images have been disclosed in U.S. Pat. No. 7,006,709B2 and US2014307045A1.

"Relief mosaics by joint view triangulation", by Lhuillier et al, Proceedings of the IEEE conference on computer vision and pattern recognition, part 1, 8 Dec. 2001, discloses a stitching method according to the preamble of claim 1. Here, a relief mosaic is represented by a collection of images with an associated Joint View Triangulation (JVT) for adjacent pairs of images. The overlapping sections of two adjacent images are locally interpolated. This interpolation computes the final position of a vertex in the new mosaic coordinates using a weighting that depends the distances of the corresponding vertices to the boundaries of their respective images in the overlapping region.

A drawback of the above interpolation approach is that it requires the complex construction of a triangulation, which may not perfectly follow the per pixel displacement between subimages resulting in artefacts in the final image.

It is an object of the present invention to provide a solution to the abovementioned stitching problem wherein the occurrence of artefacts is minimized.

SUMMARY OF THE INVENTION

This object is achieved with the method according to the invention which is characterized in that the interpolation position corresponds to a weighted sum of positions of the corresponding pixels, wherein the weighting factor for the position of a corresponding pixel in a given sub-image depends on a relative distance of at least one of said corresponding pixel and said interpolation position to a border of the region to be stitched associated with that sub-image.

According to the present invention, corresponding pixels are used to determine the pixel value of a pixel at the interpolation position in the final image. The invention further stipulates that the distance between each pixel among the corresponding pixels and the interpolation position depends on the relative distance of said each pixel to a border of the region to be stitched associated with that sub-image and/or on the relative distance of the interpolation position to a border of the region to be stitched associated with the sub-image corresponding to said each pixel.

The relative distance may correspond to a distance of at least one of said corresponding pixel and said interpolation position to a border of the region to be stitched associated with that sub-image relative to the sum of those relative distances for all sub-images. For example, the relative distance is given by:

$$\frac{d_i}{\sum_{n=1}^{N} d_n} \quad \text{Equation 1}$$

wherein $d_i$ is the distance of at least one of said corresponding pixel and said interpolation position to a border of the region to be stitched associated with sub-image i, and wherein N is the total number of sub-images.

The weighting factor for the position of a corresponding pixel in a given sub-image may equal the relative distance associated with that sub-image.

In an embodiment, the weighting factor decreases if the distance of the pixel or the interpolation position to the border decreases.

The distance to the border may generally be computed as the shortest distance to the border. Furthermore, the border may comprise an arbitrary curve or a collection of curves, which are connected to form a larger curve or contour.

The corresponding pixels in the plurality of sub-images may be pixels that relate to the same region or point of an object or feature that is imaged in the plurality of sub-images. For instance, the feature may comprise a house that is visible in each of the sub-images. However, the position of this house appears to be different after globally aligning the sub-images. Pixels may then be identified in each of the sub-images that relate to the same spot on the house. These pixels can be identified using known techniques such as motion estimation.

The border of the region to be stitched associated with a sub-image may correspond to an edge of that sub-image in the aligned plurality of sub-images. Here, the aligned plurality of sub-images may refer to an imaginary composite image of the plurality of sub-images. The edge of the sub-image refers to the edge of that sub-image that is present in the composite image. The region to be stitched may correspond to an entire region in which at least two or more sub-images are overlapping.

Alternatively, the region to be stitched could be centred about a curve through a region in said plurality of images in which at least two of said sub-images are overlapping. In this manner, the overlapping region may not be entirely used for stitching. In such case, the method may further comprise determining a correction benchmark using the differences in pixel values between the respective corresponding pixels for a plurality of pixels in the region to be stitched, comparing the correction benchmark to a predefined threshold, and if the correction benchmark exceeds the predefined threshold, extending the region to be stitched.

For instance, the region to be stitched comprises 100 pixels corresponding to 100 interpolation positions. The pixel values for these pixels are determined using two sub-images. For each pixel in the region to be stitched, two pixel values are available from the two sub-images by which a pixel value can be determined. When a large difference exists between these pixel values, it may be expected that a large parallax correction has occurred. In such case, it may be advantageous to use a broader region to be stitched. To that end, the differences for each of the 100 pixels may be combined into a single correction benchmark that can be compared to a threshold.

The method may additionally or alternatively comprise determining a displacement vector field in the region to be stitched that indicates a difference in position between corresponding pixels in different sub-images, and calculating the curve using the displacement vector field. Here, the displacement vector field is a vector field comprising vectors between corresponding pixels. The curve could for instance be calculated using a least cost optimization technique and/or wherein the curve is configured to avoid regions in which the displacement vectors are relatively large. Hence, the region to be stitched may be chosen such that it excludes regions in the global alignment of sub-images that are characterized by large differences in position between corresponding pixels. It may therefore exclude regions that comprise features indicative of a large parallax artefact. In such case, it may be advantageous to only use pixel information from one of the sub-images to determine the pixels in the final image. It may be possible to vary, preferably gradually, the width of the region to be stitched, for instance depending on the magnitude of the displacement vectors.

The method may further comprise determining an interpolation position in the region to be stitched, and finding, preferably by means of optimization, the corresponding pixels of which the pixel values are to be used for determining the pixel value of the pixel at the determined interpolation position.

Finding the corresponding pixels may comprise finding the corresponding pixels such that an estimated interpolation position, which is computed using a weighted sum of the positions of those corresponding pixels, substantially corresponds to the determined interpolation position, wherein the weighting factors to be used for said computation are calculated using the determined interpolation position.

Additionally or alternatively, the finding of corresponding pixels may in this case comprise a) guessing a set of positions of the corresponding pixels, b) determining the weighting factors for the corresponding pixels, c) calculating an estimated interpolation position by applying the weighted sum of the guessed positions of the corresponding pixels, and d) determining an error between the estimated interpolation position and the determined interpolation position and repeating the steps a)-d) if the error exceeds a predefined threshold. Alternatively, the weighting factors may solely depend on the determined interpolation position. In this case, the method may further comprise calculating the weighting factors using the determined interpolation position.

Alternatively, finding the corresponding pixels may comprise a step a) of guessing weighted test vectors for finding corresponding pixels such that when an interpolation position would be calculated using those pixels, it would at least substantially correspond to the determined interpolation position, said weighted test vectors being calculated using the determined interpolation position, and a step b) of determining an error between pixels found using the weighted test vectors and repeating steps a)-b) if the error exceeds a predefined threshold.

Alternatively, the method may comprise finding a set of corresponding pixels in the plurality of globally aligned sub-images, and determining, preferably by means of optimization, an interpolation position that corresponds to the weighted sum of the positions of the set of corresponding pixels.

The interpolation position may be determined using the steps of a) guessing an interpolation position, b) determining the weighting factors for the corresponding pixels, c) calculating an estimated interpolation position by applying the weighted sum of the positions of the corresponding pixels using the determined weighting factors, and d) determining an error between the estimated interpolation position and the guessed interpolation position, and repeating steps a)-d) if the error exceeds a predefined threshold. Alternatively, the weighting factors may solely depend on the positions of the corresponding pixels. In this case, the method may further comprise calculating the weighting factors using the determined positions of the corresponding pixels.

The pixel value of the pixel at the interpolation position in the region to be stitched may be determined by weighting the pixel values of the corresponding pixels associated with that interpolation position. Such weighting may comprise applying further weighting factors to the pixel values of the corresponding pixels. These weighting factors may be chosen such that weighting factors, which are applied to pixels among the corresponding pixels that lie far from the border, are relatively large. This reflects the notion that pixels that lie far away from the border may be more appropriate candidates for stitching than pixels that lie close to the border. This allows a gradual transition from one image to the other. In a preferred embodiment, these further weighting factors are identical to the weighting factors.

According to a second aspect, the present invention provides a device for stitching a plurality of globally aligned sub-images in a region to be stitched, which comprises a memory for holding said plurality of sub-images, a stitching region determining unit to determine the region to be stitched, and a processor configured to construct a final image using the plurality of sub-images, said constructing comprising performing the method as defined in any of the previous claims to stitch the sub-images in the region to be stitched.

According to a third aspect, the present invention provides a computer readable medium comprising instructions that, when run on a processor, instruct this processor to perform the method as described above.

BRIEF DESCRIPTION OF THE DRAWINGS

Next, the present invention will be described in more detail referring to the appended drawings, wherein.

DESCRIPTION OF THE INVENTION

Figure 2:
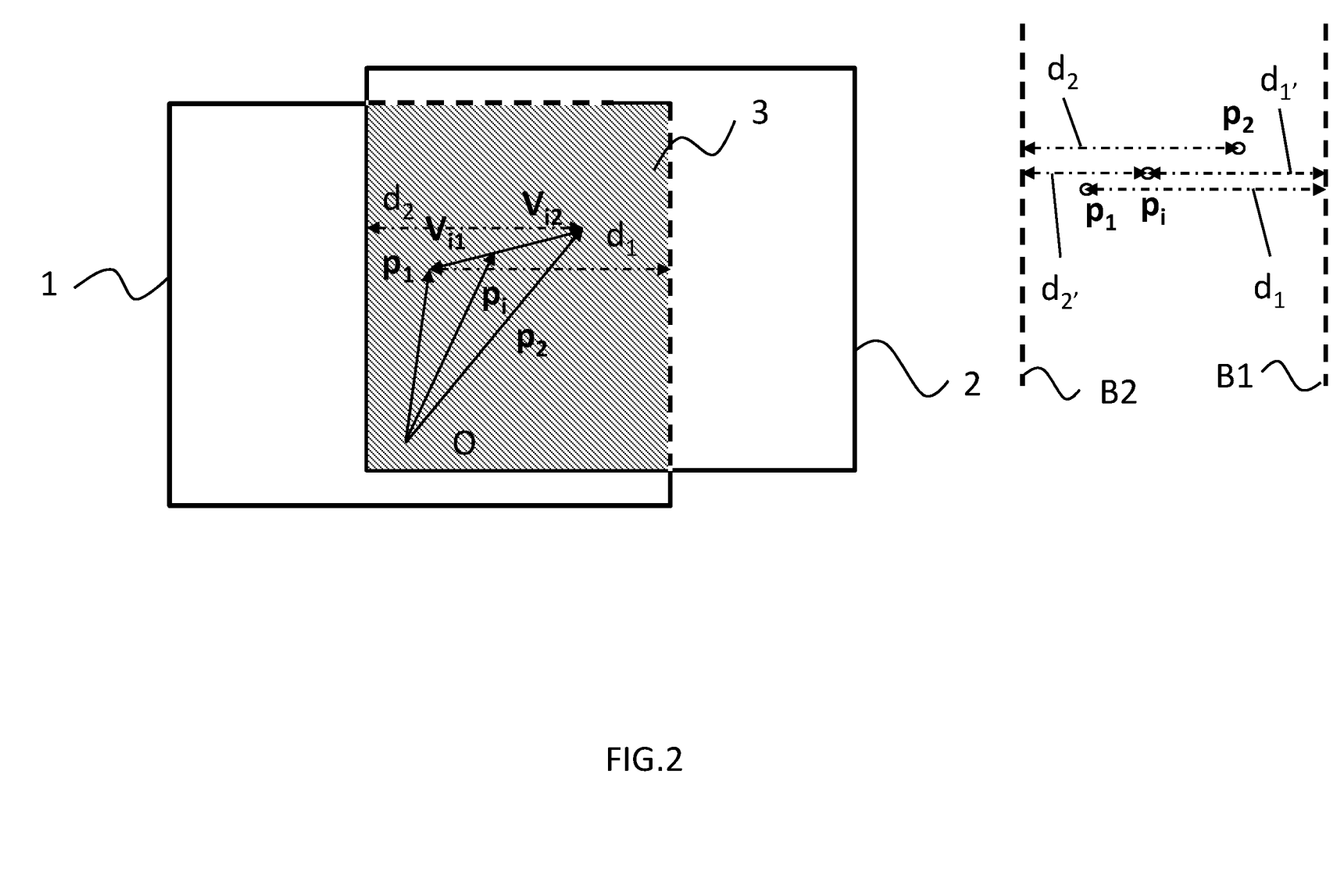
FIG. 2 illustrates the general concept of the present invention using two sub-images.

FIG. 2 illustrates the general concept of the present invention in case two sub-images need to be stitched. The pixel value at an interpolation position $p_i$ in the final image needs to be determined using sub-images 1, 2. Vectors $V_{i1}$ and $V_{i2}$ point to corresponding pixels in sub-images 1 and 2, respectively, which pixels are used to determine the pixel value of the pixel at interpolation position $p_i$ in the final image. Hence:

$$p_1 = p_i + V_{i1}$$

$$p_2 = p_i + V_{i2} \qquad \text{Equation 2}$$

According to the present invention, the distance between each of the corresponding pixels and the interpolation position depends on:

a distance from the interpolation position to a respective border associated with a respective sub-image (distance method 1);

a distance from each of the corresponding pixels to a respective border associated with the respective sub-image (distance method 2);

a mixture of these distances (distance method 3).

The distances indicated under methods 1 and 2 above are illustrated on the right hand side of FIG. 2. Here, $d_n$ indicates a distance from the corresponding pixel with position $p_n$ to the border $B_n$ associated with sub-image n. On the other hand, $d_n$, indicates a distance from the interpolation position with position $p_i$ to the border $B_n$ associated with sub-image n.

The applicant has found that using distance method 1 or 3 may provide slightly improved results in terms of artefacts that are not or not as clearly visible in the final image as when using distance method 2.

Hereinafter, the distance that is used during the stitching is referred to as $d_n$, regardless the distance method used. In this case, the general concept of the present invention, when applied to two sub-images, can be described by the following equation:

$$\left|\frac{V_{i1}}{d_2}\right| = \left|\frac{V_{i2}}{d_1}\right| \quad \text{Equation 3}$$

In other words, when distance $d_1$ increases, the corresponding vector $V_{i1}$ will decrease in length. Ultimately, when $d_1$ becomes zero, e.g. when a corresponding pixel lies on the border $B_1$ (distance method 2), $V_{i2}$ becomes zero. The latter indicates that the interpolation position $p_i$ corresponds to the position of the corresponding pixel in sub-image 2, i.e. $p_2$.

FIG. 2 on the left hand side illustrates a distance $d_1$ from a corresponding pixel at position $p_1$ in sub-image 1 to the border of this sub-image, which border is indicated by the dashed line. Here it is noted that in FIG. 2 the region to be stitched comprises the entire region in which sub-images 1, 2 are overlapping.

Assuming that vectors $V_{i1}$ and $V_{i2}$ are oppositely arranged, i.e. $d_1 V_{i1} = -d_2 V_{i2}$, Equation 2 and Equation 3 can be combined into:

$$p_i = w_1 \cdot p_1 + w_2 \cdot p_2 \quad \text{Equation 4}$$

wherein $w_1$ and $w_2$ are weighting factors given by:

$$w_1 = \frac{d_1}{d_1 + d_2} \quad \text{Equation 5}$$

$$w_2 = \frac{d_2}{d_1 + d_2} \quad \text{Equation 6}$$

where it is noted that the weighting factors may depend on the interpolation position (e.g. distance method 1) and/or on the positions of the corresponding pixels (e.g. distance method 2). Hence, according to the present invention, the interpolation position corresponds to a sum of weighted positions of the corresponding pixels that are used to determine the pixel value of the pixel at the interpolation position, wherein the weighting factor for the position of each corresponding pixel depends on the relative distance of at least one of the corresponding pixel and the interpolation position to a border of the region to be stitched associated with that sub-image. This concept can easily be generalized for N overlapping images into:

$$p_i = \sum_{n=1}^{N} w_n \cdot p_n \quad \text{Equation 7}$$

wherein $$w_i = \frac{d_i}{\sum_{n=1}^{N} d_n} \quad \text{Equation 8}$$

If a combination of corresponding pixels $p_n$ and interpolation position $p_i$ is found that satisfies Equation 7, than those corresponding pixels can be used to determine the pixel value of the pixel at that interpolation position.

Figure 3:
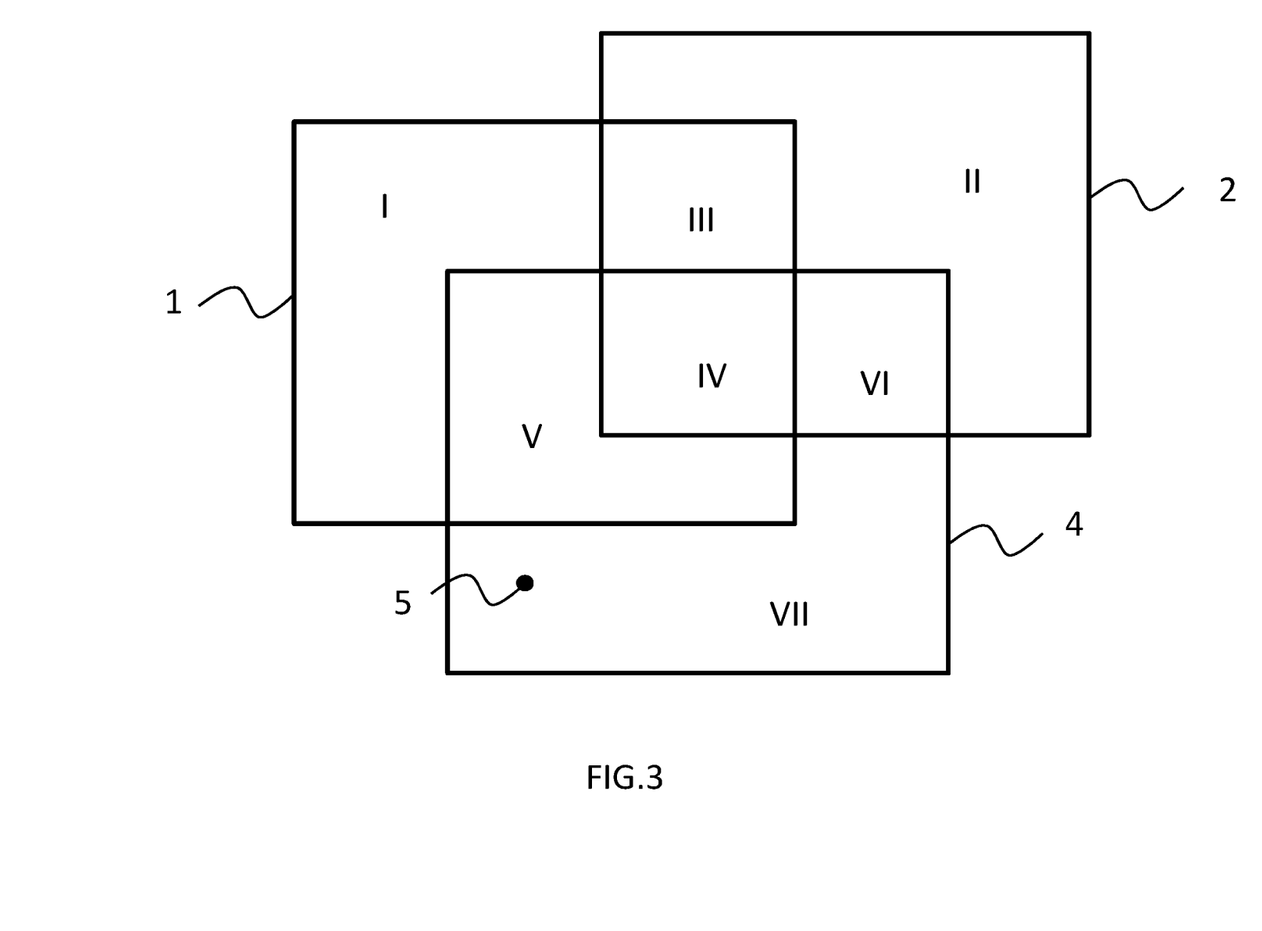
FIG. 3 illustrates different regions to be stitched when three sub-images overlap.

FIG. 3 illustrates the situation wherein three sub-images 1, 2, 4 show partial overlap. The following table shows which sub-images are overlapping in which region after global alignment.

| Region | Sub-images |
|---|---|
| I | 1 |
| II | 2 |
| III | 1 + 2 |
| IV | 1 + 2 + 4 |
| V | 1 + 4 |
| VI | 2 + 4 |
| VII | 4 |

Sub-image 1 is relevant to four different regions. In region I, the weighting factors for pixels in sub-image 1 can be set to 1 as the other sub-images do not contain image information for that position. In region III, the weighting factors for pixels in sub-images 1 and 2 are determined by comparing the distance from those pixels and/or the interpolation position to the border associated with sub-image 1 and to the border associated with sub-image 2, respectively. For region IV, three sub-images are taken into account. If a corresponding pixel in a given sub-image is found that is outside of the relevant region to be stitched, the associated weighting factor can be set to zero. For instance, pixel position 5 in sub-image 4 is associated with a weighting factor equal to zero when this position indicates a pixel that corresponds to another pixel in sub-image 1 or 2 when trying to interpolate inside region IV.

Figure 4:
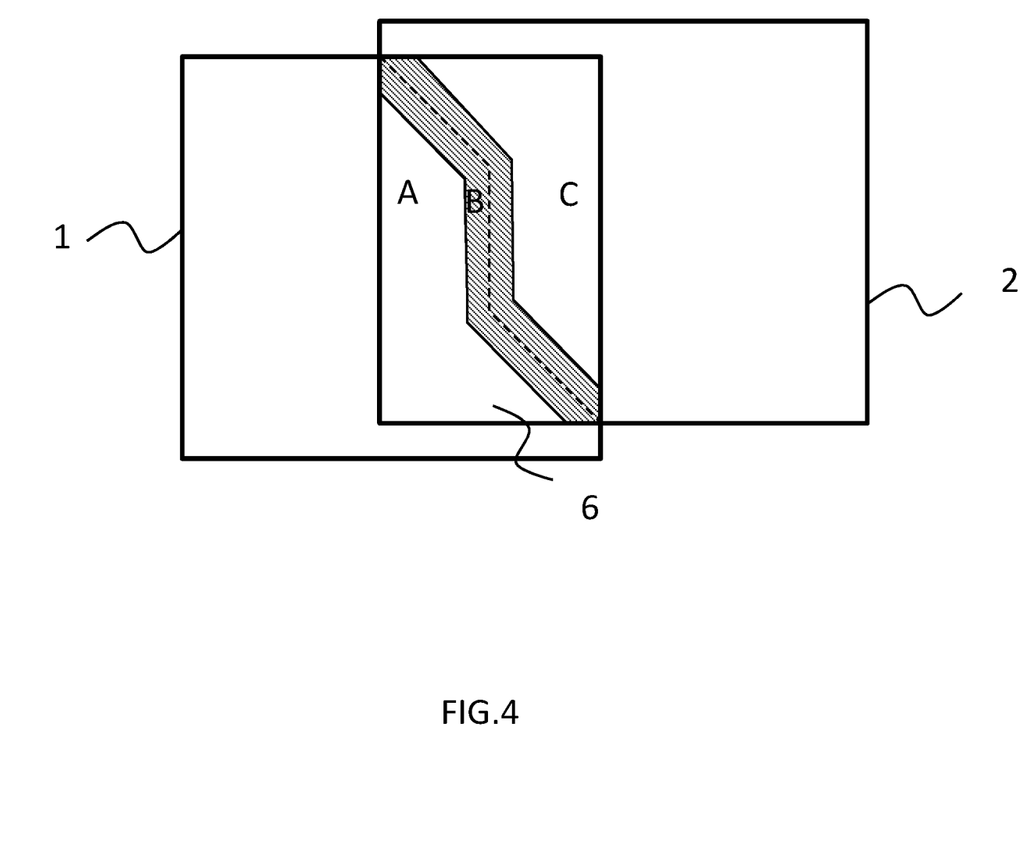
FIG. 4 illustrates a region to be stitched based on a curve.

In addition to using the full overlapping region, bounded regions can be used. In such case, only a limited region can be used in which image stitching is applied. Such region can for instance be defined around a centre line or curve 6 in the overlapping region, as shown in FIG. 4. Here, weighting factors for sub-image 1 in region A are set to one and in region C to zero. In region B, the weighting factors depend on the distance to the border associated with sub-image 1.

FIG. 4 illustrates a straight line 6 as an example of a curve. However, the invention is not limited thereto.

Figure 5:
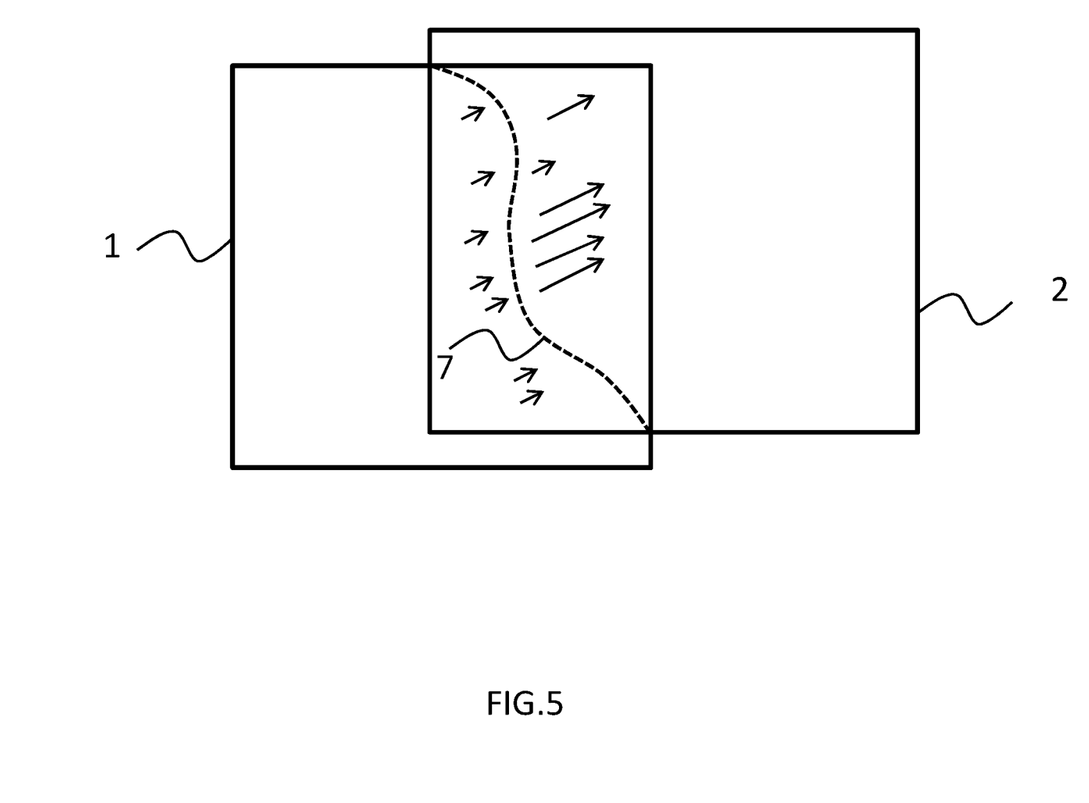
FIG. 5 illustrates a region to be stitched based on a displacement vector field.

Alternative methods exist to define the region to be stitched. For instance, the region to be stitched may be formed based on a displacement vector field, as illustrated in FIG. 5. Here, a displacement vector indicates the vector from a pixel in a given sub-image to a corresponding pixel in another sub-image. A curve 7 may be found through this field based on a least cost approach wherein the sum of the displacements of the pixels crossed by the curve, or crossed by the curve and a certain region, is minimized. Once this curve is found, a certain region surrounding the curve can be used to perform the image stitching. Additionally or alternatively, the construction of the region to be stitched can be performed adaptively. For instance, for a given starting region the average amount of correction per pixel can be computed. Such correction can be computed using the difference between the pixel values of the corresponding pixels in the different sub-images. If the average correction per pixel is too high, the region to be stitched can be expanded and the image stitching process can be repeated.

To find a combination of corresponding pixels $p_1 \ldots p_n$ and interpolation position $p_i$ that satisfies Equation 7, two different methods will be discussed. In the second method, the interpolation position is chosen and the corresponding pixels that should be used for that interpolation position are sought, whereas in the first method, the corresponding pixels are first determined after which an interpolation position is sought.

An advantage of first determining the interpolation position $p_i$ (second method), is that $p_i$ can be chosen to align with the regular pixel grid of the composite image one wants to create, i.e. every integer pixel position in the stitch region of the composite image. Its corresponding pixel positions $p_1 \ldots p_n$ are real valued when using subpixel accurate matching techniques to derive the correspondences. One can use known sampling/interpolation techniques, e.g. bi-linear, bi-cubic, or Lanczos sampling, to fetch the pixel or vector values in images $1 \ldots n$ based on these real valued position vectors. This method resembles inverse warping.

If one first determines $p_1 \ldots p_n$ and then derives a real valued position $p_i$ (first method), the latter might not be aligned with the pixel grid of the composite image. To get alignment with the regular grid of the composite image, one can use forward warping (or "splatting") techniques. E.g. calculating for each pixel or vector at a real valued position $p_i$ its (distance) weighted contributions to the surrounding regular/integer grid pixels or vectors. This is usually done in a contribution pass, where a separate weight map is kept, and a normalization pass where the weights are used to normalize the values in the regular grid.

In both methods known techniques are used to find corresponding pixels. In the following section an important aspect of these techniques is detailed, namely the originating position.

Following this explanation the two methods are further detailed.

Finding Correspondences

Techniques to find dense pixel correspondences such as motion estimation, optical flow estimation and (stereo) disparity estimation typically yield their result in the form of a vector field containing a displacement vector for each pixel or block of pixels. For instance, a full search block matching motion estimation technique can be used to test (for each pixel or block of pixels) all possible displacement vectors by means of block correlation and assign the vector with the best correlation value.

In practice, a lot of techniques are based on more refined (and faster) optimization and combine a matching term (e.g. pixel/block/feature correlation, gradient constraint equations) with extra terms/constraints, such as a smoothness term that prevents the vector from deviating too much from vectors estimated at neighboring positions.

When applying these techniques, it is important to consider the "position" the vectors or the vector field originate(s) at. For example, it is possible to estimate a displacement vector field $vf_{12}$ valid at the "position" of image 1, containing for a pixel position $p_1$ the displacement vector to a matching pixel position $p_2$ in image 2 in accordance with Equation 9. Image 1 and 2 are assumed to be overlapping images with the same coordinate system.

$$p_2 = p_1 + v_{12} = p_1 + vf_{12}(p_1) \quad \text{Equation 9}$$

Similarly, it is possible to estimate a vector field originating at the "position" of image b in accordance with Equation 10.

$$p_1 = p_2 + v_{21} = p_2 + vf_{21}(p_2) \quad \text{Equation 10}$$

With some techniques, it is also possible to estimate a vector field originating at an "in-between" virtual image position x. For example in the middle of images 1 and 2:

$$p_1 = p_x + 0.5 * v_x = p_x + 0.5 * Vf_x(p_x) \quad \text{Equation 11}$$

$$p_2 = p_x - 0.5 * v_x = p_x - 0.5 * vf_x(p_x) \quad \text{Equation 12}$$

Or at an arbitrary virtual image position $\gamma$, where $\gamma$ lies between zero and one (indicating the position between image a and b):

$$p_1 = p_x + \gamma * v_x = p_x + \gamma * vf_x(p_x) \quad \text{Equation 13}$$

$$p_2 = p_x + (1-\gamma) * v_x = p_x + (1-\gamma) * vf_x(p_x) \quad \text{Equation 14}$$

For a block matching motion estimator, the above equations can be used to derive for a displacement vector being tested, the set of positions on which the block correlation has to be applied. The test vectors "pivot" around the position $p_x$.

In general, vector fields estimated at different originating image positions $\gamma$ contain the same vector values but at shifted spatial positions. In practice they can differ somewhat due to numerical, occlusion and other (estimation) effects such as ill-posed conditions.

Alternatively or additionally, the forward warping technique discussed in conjunction with the first method can be used to "project" a vector field to a different originating position. Due to occlusion effects holes and overlaps can occur in this projection, this effect can be targeted with known occlusion handling techniques.

The First Method; Distance Method 1

Figure 6A:
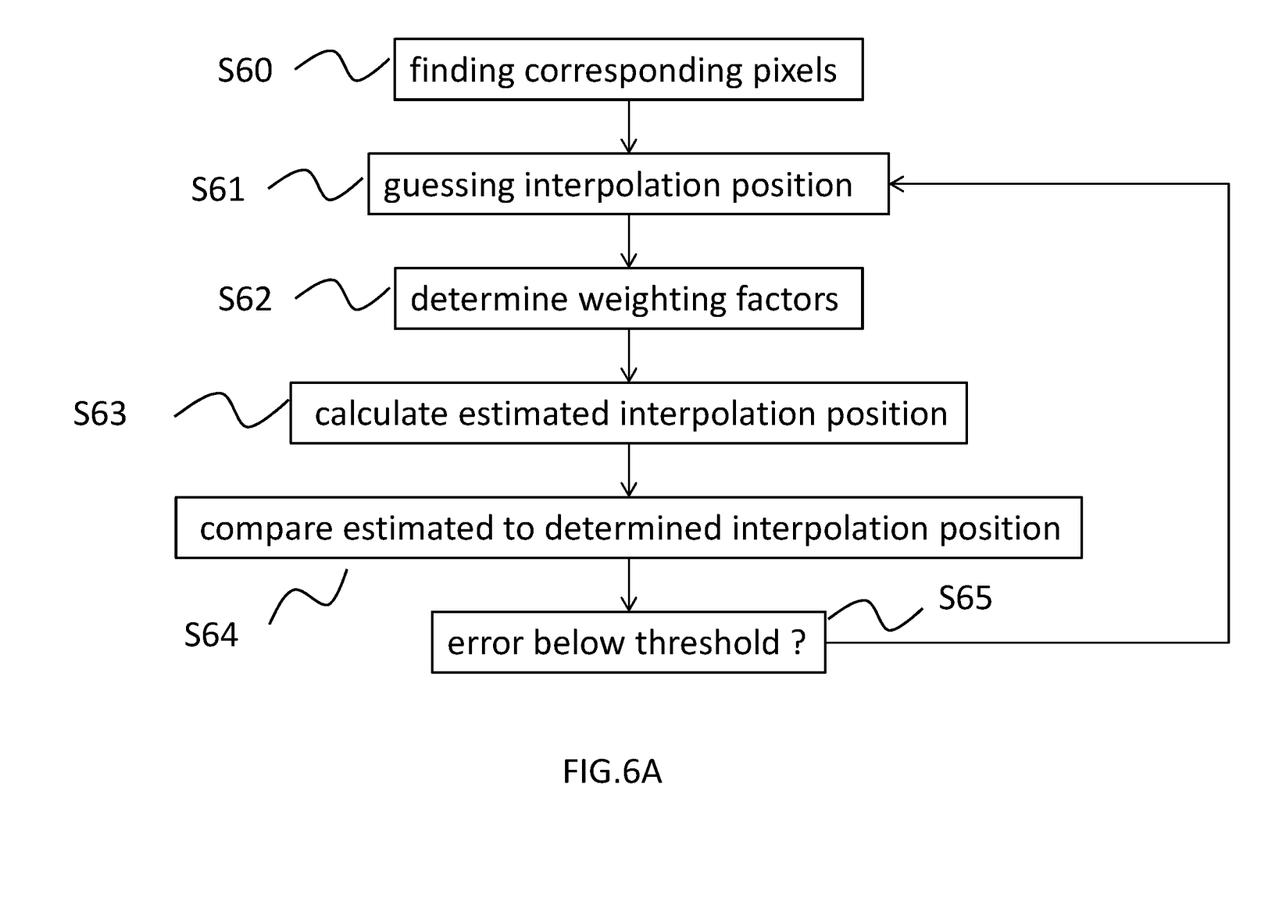
FIGS. 6A and 6B illustrate a first method to perform the image stitching according to the present invention.

In a variant of the first method, illustrated in FIG. 6A, the first distance method is used. Consequently, direct computation of the interpolation position is not possible due to the fact that the required weighting factors depend on the unknown interpolation position. In this case, the interpolation position $p_i$ can be found by optimization using Equation 15:

$$\min_{pi} |p_i - \Sigma_{n=1}^{N} w_n \cdot p_n| \quad \text{Equation 15}$$

In detail, after determining the corresponding pixels in step S60, the interpolation position can be found by first guessing an interpolation position in step S61. Next, in step S62 the weighting factors are determined. In step S63, an estimated interpolation position can be found by applying Equation 7 using the determined weighting factors and the corresponding pixels that were already found. In step S64, this estimated interpolation position is compared to the guessed interpolation position. The resulting error is compared to a threshold in step S65. If the error is above a certain threshold, the process returns to guessing the interpolation position.

For three sub-images 1-3, Equation 15 can be re-written as:

$$\min_{pi} |p_i - p_1 - w_2 \cdot V_{12} - w_3 \cdot V_{13}| \quad \text{Equation 16}$$

wherein $p_1$, $V_{12}$, and $V_{13}$ are known as these parameters relate to corresponding pixels, which in the first method have already been found. Depending on the distance method used, weighting factors $w_2$ and $w_3$ are already known (distance method 2) and the interpolation position can be calculated directly, or the weighting factors depend on the interpolation position (distance methods 1 and 3) and the interpolation position is computed by optimization. A generic optimization algorithm, such as stochastic hill climbing, can be used to find the best solution for $p_i$.

For two sub-images 1 and 2, Equation 15 reduces to:

$$\min_{pi} |p_i - p_1 - w_2 \cdot V_{12}| \quad \text{Equation 17}$$

Optimization of this equation, when required if distance method 1 or 3 is used, is generally performed along the line from $p_1$ to $p_2$.

The first method is well suited, but not limited to, finding the corresponding pixels by means of estimating the pairwise vector fields (e.g. $vf_{12}$, $vf_{21}$ in the previous section).

In the first method, the calculated interpolation position may be off grid. In such case, a pixel value can nevertheless be computed. A distance weighting can be used to determine how the pixels in the final image surrounding the off grid interpolation position are influenced by this pixel value.

The First Method; Distance Method 2

Figure 6B:
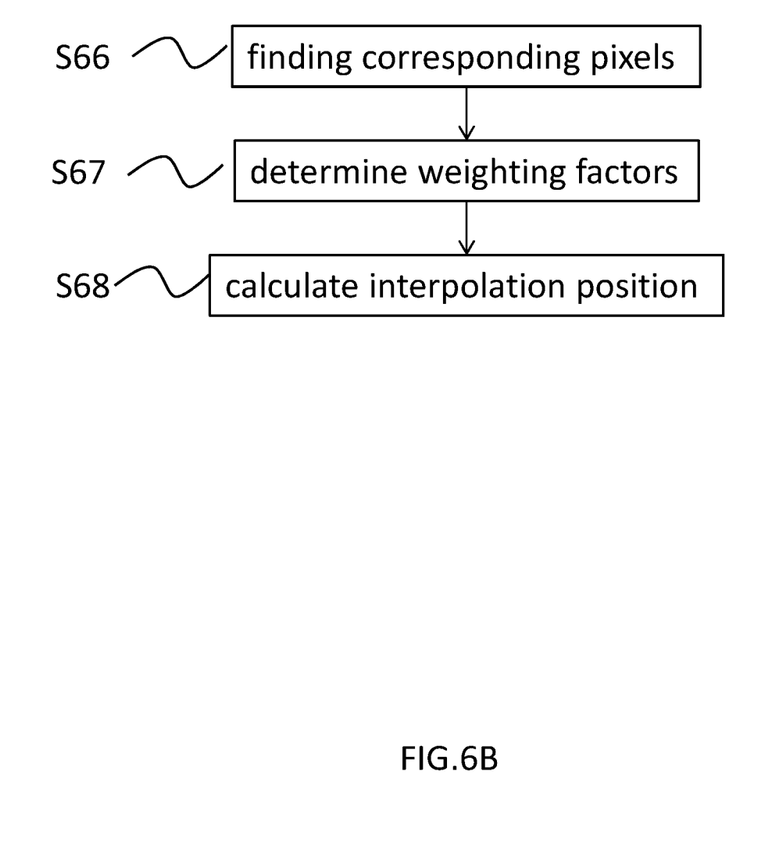

In a variant of the first method, illustrated in FIG. 6B, corresponding pixels are found using known techniques in step S66. In FIG. 6B, distance method 2 is used so the weighting factors can be calculated directly in step S67, after which the interpolation position can be calculated in step S68 using Equation 7.

The Second Method; Distance Method 1

In the second method, the interpolation position is determined and the corresponding pixels are sought, such that Equation 7 is satisfied. The weighted positions of the corresponding pixels should be equal to the interpolation position. Equivalently, by Equation 2, the vectors $v_{i1} \ldots v_{in}$ are sought that satisfy Equation 7.

Figure 7A:
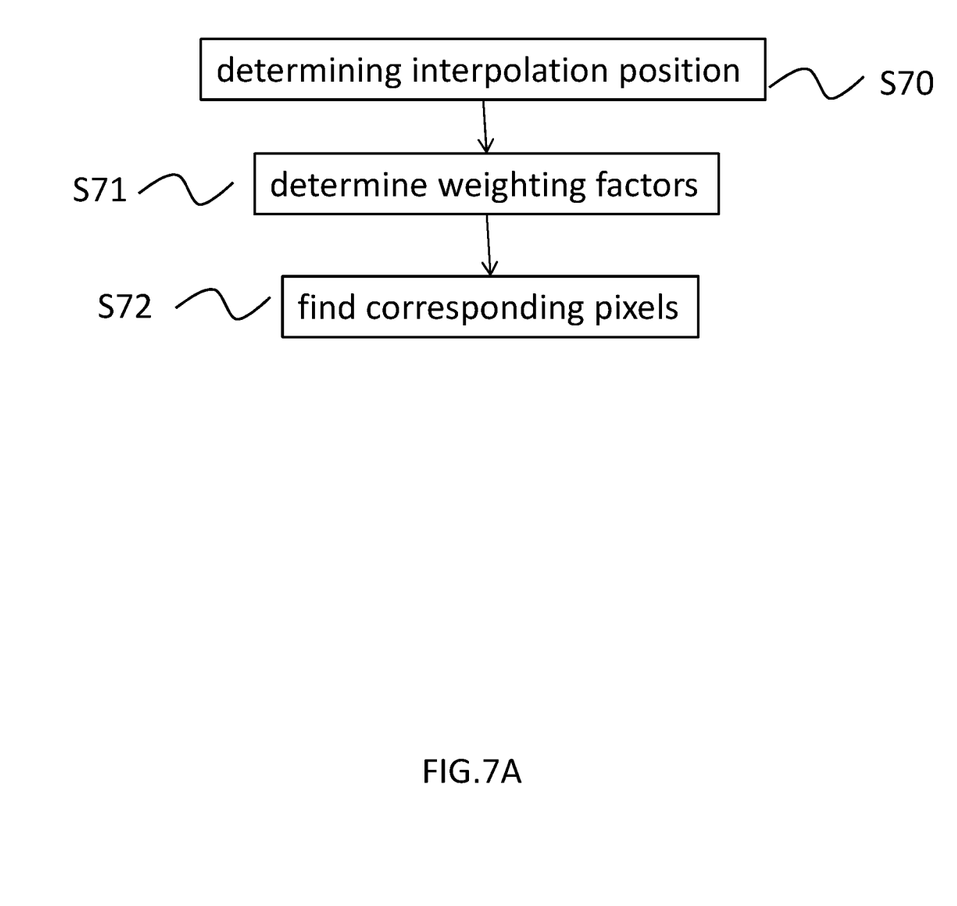
FIGS. 7A and 7B illustrate a second method to perform the image stitching according to the present invention.

In a variant of the second method, distance method 1 is used as shown in FIG. 7A. In this case, the weighting factors can be computed directly in step S71 after determining the interpolation position in S70. The corresponding pixels are determined thereafter in step S72.

The second method is well suited, but not limited to, finding the corresponding pixels by motion estimation with the interpolation position as originating position (e.g. by determining $v_{i1}, v_{i2}, v_{i3}$). In this case, the estimation follows the same symmetry principle as the "in-between" estimation explained earlier in connection with Equations 11-14. The "pivot" point is based on Equation 7 and can be generalized for N images. More in particular, Equation 7 can be used to express the position $p_j$ of corresponding pixel j in the interpolation position $p_i$ and the positions $p_n$ of the other corresponding pixels:

$$v_{in} = p_n - p_i = \Sigma_{m=1, m \neq n}^{M} w_m \cdot p_m + (1-w_n) \cdot p_n \qquad \text{Equation 18}$$

For three images, Equation 18 can be re-written into:

$$v_{i1} = (1-w_1)p_1 + w_2 p_2 + w_3 p_3 \qquad \text{Equation 19}$$

$$v_{i2} = w_1 p_1 + (1-w_2)p_2 + w_3 p_3 \qquad \text{Equation 20}$$

$$v_{i3} = w_1 p_1 + w_2 p_2 + (1-w_3)p_3 \qquad \text{Equation 21}$$

where $v_{in}$ are test vectors that originate at the interpolation position $p_i$. To find suitable test vectors to initiate a search, it may be advantageous to use information from an interpolation at an adjacent interpolation position $p_i'$ that used the position vectors $p_1', p_2', p_3'$. These vectors point to known corresponding pixels. The weighting for interpolation position $p_i$ can be applied to these vectors to find vectors $v_{in}'$:

$$v_{in}' = \Sigma_{m=1, m \neq n}^{M} w_m \cdot p_m' + (1-w_n) \cdot p_n' \qquad \text{Equation 22}$$

Next, vectors $v_{ij}'$ are translated to interpolation position $p_i$ to find suitable test position vectors:

$$p_n = p_i + v_{in}' \qquad \text{Equation 23}$$

Thereafter, variations can be applied to these test position vectors to search for the best matching set of corresponding pixels (or blocks) for which the weighted sum of the position vectors corresponds to interpolation position In the abovementioned embodiment, the error used to control the optimization was related to the difference in image information of the pixels pointed at by the test vectors. The required weighting, which is determined by the interpolation position, was accounted for in the test vectors themselves. In other words, the pixels pointed at necessarily fulfilled the condition that if the weighted sum of the positions of those pixels were to be used for calculating an interpolation position, than that calculated position would correspond to the interpolation position that was set at the start of the optimization.

Alternatively, the weighting can be applied after having found corresponding pixels. In such an embodiment, one could first, in a step a) guess a set of positions of corresponding pixels. Hence, at this stage, it has been verified that the pixels are in fact corresponding pixels but it remains uncertain whether these pixels correspond to the interpolation position that was set at the start of the optimization. Next, in a step b) the weighting factors can be determined for the corresponding pixels. It should be noted that these weighting factors are already known when the weighting factors solely depend on the interpolation position. In a step c), an estimated interpolation position can be calculated by applying the weighted sum of the guessed positions of the corresponding pixels. In step d) an error is calculated between the estimated interpolation position and the determined interpolation position. If the error exceeds a predefined threshold, steps a)-d) are repeated and a new set of corresponding pixels is tested.

The Second Method; Distance Method 2

Figure 7B:
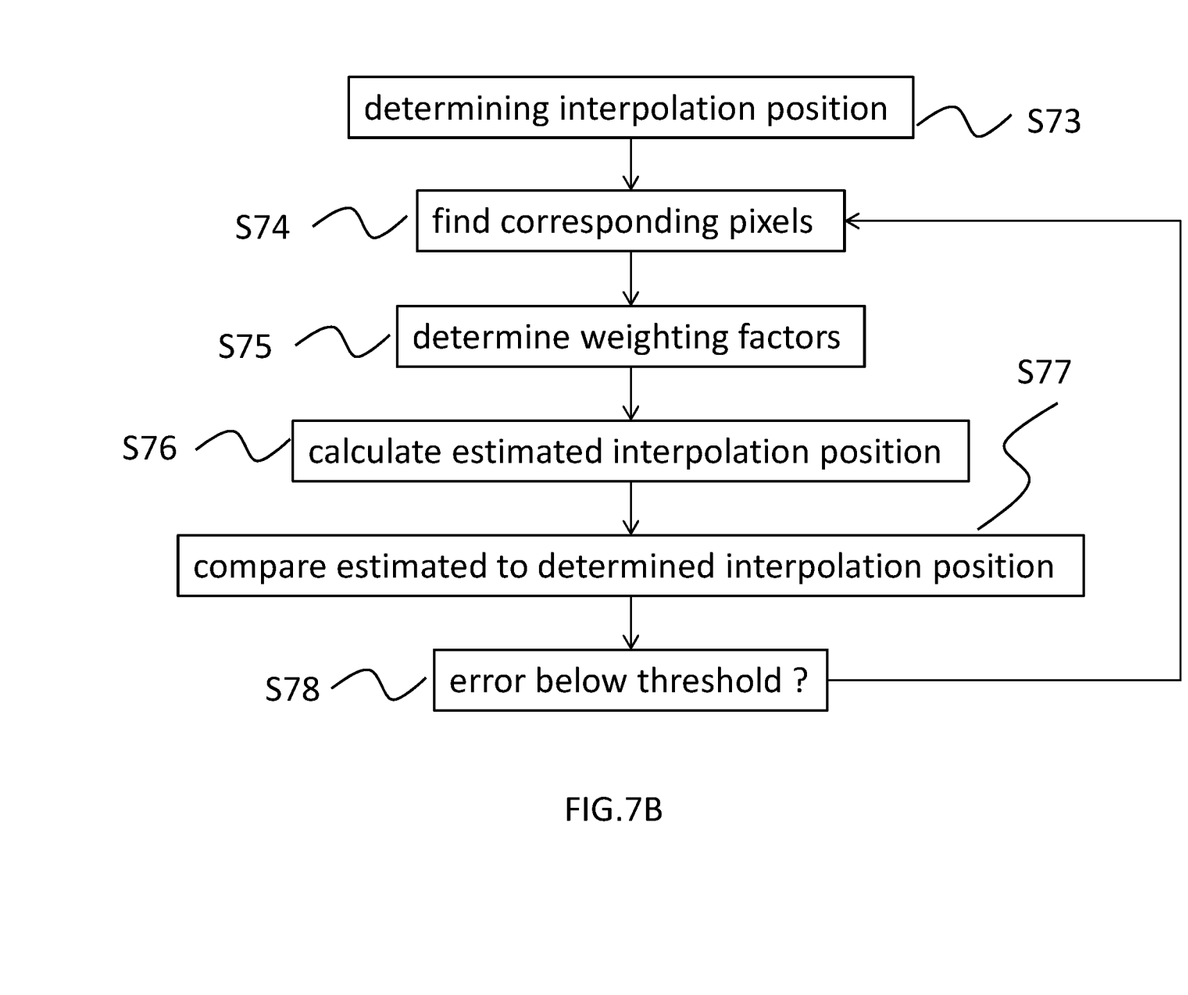

In a variant of the second method, distance method 2 is used as illustrated in FIG. 7B. The interpolation position is determined in step S73 and the corresponding pixels must be found. In this case, Equation 7 equally applies. However, in this case the positions of the corresponding pixels are guessed in step S74.

As a next step, the weighting factors are determined in step S75. Because distance method 2 is used, the weighting factors can only be calculated after guessing the corresponding pixels.

Next, an estimated interpolation position is calculated based on the guessed positions of the corresponding pixels and the determined weighting factors in step S76. In step S77, this estimated interpolation position is compared to the interpolation position that was determined in step S73. The resulting error is compared to a threshold in step S78. If the error is above a certain threshold, the process returns to guessing the positions of the corresponding pixels.

For all methods described above, wherein an optimization step is used, such as guessing vectors or positions, it may be beneficial to use a previous combination of an interpolation position and corresponding pixels, preferably relating to an adjacent interpolation position, as a starting point for the optimization process.

In the examples above, methods have been described to interpolate between more than two images simultaneously. Alternatively, the interpolation process could be performed by cascading a two image interpolation process. For instance, assume that 4 images need to be combined into a single image. As a first step, a first intermediate image can be constructed by interpolating between the first and second image. Next, a second intermediate image can be constructed by interpolating between the first intermediate image and the third image. The final image can then be constructed by interpolating between the second intermediate image and the fourth image Pixel Value Determination at the Interpolation Position The process of finding a combination of interpolation position and corresponding pixels as described above has to be repeated for each position in the region to be stitched. Once the combination of interpolation position and corresponding pixels is known the pixel values of the final image can be computed. To this end, a weighting using further weighting factors $v_n$ may be used:

$$I(p_i) = \Sigma_{n=1}^{N} v_n \cdot I_n(p_n) \qquad \text{Equation 24}$$

wherein $I_n$ is the pixel value of sub-image n at position $p_n$. As an example, the weighting factors $w_n$ mentioned above may be used as further weighting factors, i.e. $v_n=w_n$. Alternatively, the further weighting factors may be determined using a given distance method that is different from the distance method used for determining the weighting factors $w_n$.

It should be noted that the pixel value may relate to an intensity value, and/or a colour channel value such as a RGB value. Furthermore, in case more than one pixel value exists for each pixel, the stitching method described here can be applied to each pixel value separately. However, it is preferred to determine a suitable combination of interpolation position and corresponding pixels for one pixel value, such as the intensity, and to use this same combination to determine the other pixel values.

Figure 8:
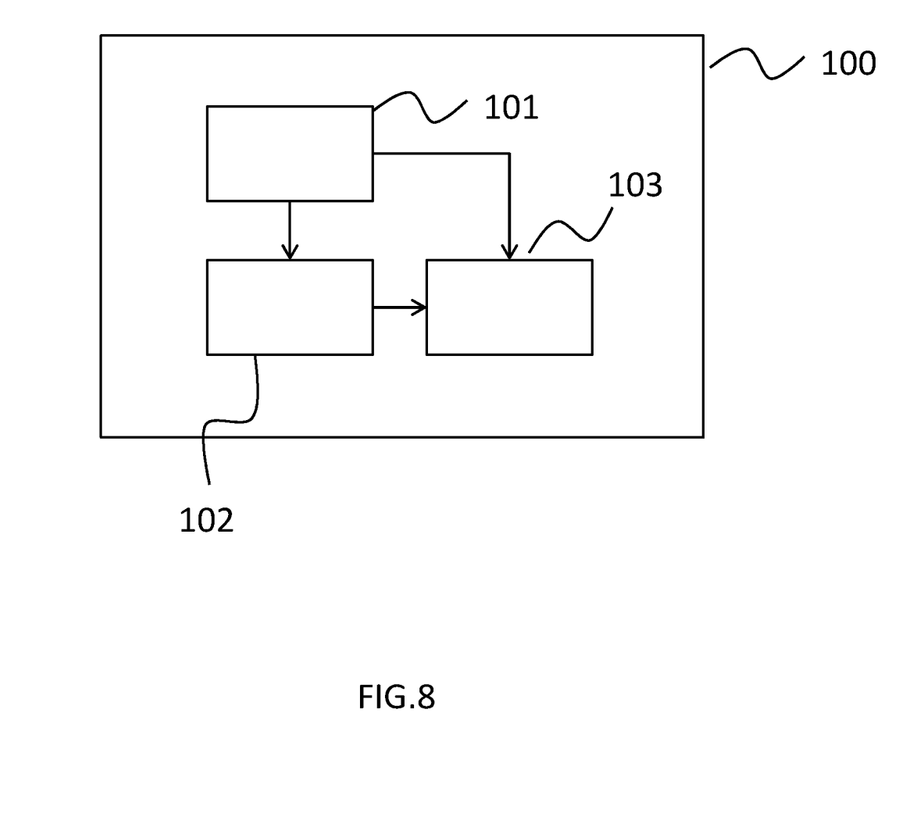
FIG. 8 illustrates an embodiment of a device according to the present invention.

FIG. 8 illustrates an embodiment of a device 100 according to the present invention. It comprises a memory 101 for holding a plurality of sub-images and a stitching region 102 determining unit to determine the region to be stitched. Device 100 also comprises a processor 103 configured to construct a final image using the plurality of sub-images, said constructing comprising performing the method as defined above to stitch the sub-images in the region to be stitched. Additionally, processor 103 may also be configured to perform global alignment on the stored sub-images. The result of this global alignment and/or the final image resulting from the stitching may also be stored in memory 101.

Although the present invention has been described using embodiments thereof, it should be apparent to the skilled person that various modifications to those embodiments are possible without deviating from the scope of the invention which is defined by the appended claims.

As an example, the present invention is related to interpolating images that have been globally aligned. Within the context of the present invention, global alignment comprises a first alignment of the images. This alignment may comprise a coordinate transformation to transform the coordinates of the raw images to the coordinates of the final image. For instance, two images each having 3000×2000 pixels, may be combined into a single image comprising 5500×2000 pixels. In this case, the pixels of the first image, corresponding to a left part, may not be transformed. The pixels of the second image, corresponding to a right part, may be transformed by using the translation (2500, 0). Accordingly, a region of overlap will be generated that extends between (2500, 0)-(3000, 2000).

In the description above, references have been made to position vectors of corresponding pixels that are relative to an origin that is common for all the images to be stitched. It should be apparent to the skilled person that these vectors can also be expressed in the coordinates of the underlying raw images in combination with the transformation related to that image. In the example above, a vector pointing to position (500, 0) relative to the origin of the raw second image is identical to a vector pointing at a pixel of the second image at position (3000, 0) relative to the common origin of the first and second image after the transformation associated with global alignment.

The invention claimed is:

1. A method for stitching a plurality of globally aligned sub-images in a region to be stitched, the method comprising:
    determining a pixel value of a pixel at an interpolation position in the region to be stitched using pixel values of corresponding pixels in said plurality of sub-images;
    wherein the interpolation position corresponds to a weighted sum of positions of the corresponding pixels;
    wherein
    the weighting factor for the position of a corresponding pixel in a given sub-image depends on a relative distance of said interpolation position to a border of the region to be stitched associated with that sub-image.

2. The method according to claim 1, wherein said relative distance corresponds to a distance of said interpolation position to a border of the region to be stitched associated with that sub-image relative to the sum of those distances for all sub-images.

3. The method according to claim 2, wherein the relative distance is given by:

$$\frac{d_i}{\sum_{n=1}^{N} d_n}$$

wherein $d_i$ is the distance of said interpolation position to a border of the region to be stitched associated with sub-image i, and wherein N is the total number of sub-images.

4. The method according to claim 1, comprising:
    finding a set of corresponding pixels in the plurality of globally aligned sub-images;
    determining an interpolation position that corresponds to the weighted sum of the positions of the set of corresponding pixels.

5. The method according to claim 4, wherein said determining comprises:
    a) guessing an interpolation position;
    b) determining the weighting factors for the corresponding pixels;
    c) calculating an estimated interpolation position by applying the weighted sum of the positions of the corresponding pixels using the determined weighting factors;
    d) determining an error between the estimated interpolation position and the guessed interpolation position and repeating steps a)-d) if the error exceeds a predefined threshold.

6. The method according to claim 1, comprising:
    determining an interpolation position in the region to be stitched;
    finding the corresponding pixels of which the pixel values are to be used for determining the pixel value of the pixel at the determined interpolation position.

7. The method according to claim 6, wherein said finding the corresponding pixels comprises finding the corresponding pixels such that an estimated interpolation position, which is computed using a weighted sum of the positions of those corresponding pixels, substantially corresponds to the determined interpolation position, wherein the weighting factors to be used for said computation are calculated using the determined interpolation position.

8. The method according to claim 6, wherein said finding the corresponding pixels comprises:
    a) guessing weighted test vectors for finding corresponding pixels such that when an interpolation position would be calculated using those pixels, it would at least substantially correspond to the determined interpolation position, said weighted test vectors being calculated using the determined interpolation position;

b) determining an error between pixels found using the weighted test vectors and repeating steps a)-b) if the error exceeds a predefined threshold.

9. The method according to claim 6, wherein said finding the corresponding pixels comprises:
   a) guessing a set of positions of corresponding pixels;
   b) determining the weighting factors for the corresponding pixels;
   c) calculating an estimated interpolation position by applying the weighted sum of the guessed positions of the corresponding pixels;
   d) determining an error between the estimated interpolation position and the determined interpolation position and repeating steps a)-d) if the error exceeds a predefined threshold.

10. The method according to claim 1, wherein the weighting factor for the position of a corresponding pixel in a given sub-image equals the relative distance associated with that sub-image.

11. The method according to claim 1, wherein the weighting factor decreases if the distance of said pixel or said interpolation position to said border decreases.

12. The method according to claim 1, wherein said distance is the shortest distance to the border.

13. The method according to claim 1, wherein the corresponding pixels in the plurality of sub-images are pixels that relate to the same region or point of an object or feature that is imaged in said plurality of sub-images.

14. The method according to claim 13, further comprising using a motion estimation technique to find corresponding pixels in said plurality of sub-images, or a technique to find dense correspondences.

15. The method according to claim 1, wherein the border of the region to be stitched associated with a sub-image corresponds to an edge of that sub-image in the aligned plurality of sub-images.

16. The method according to claim 15, wherein the region to be stitched corresponds to an entire region in which at least two or more sub-images are overlapping.

17. The method according to claim 1, wherein the region to be stitched is a region centred about a curve through a region in said plurality of images in which at least two of said sub-images are overlapping.

18. The method according to claim 17, further comprising:
   determining a correction benchmark using the differences in pixel values between the respective corresponding pixels for a plurality of pixels in the region to be stitched;
   comparing the correction benchmark to a predefined threshold;
   if the correction benchmark exceeds the predefined threshold, extending the region to be stitched.

19. The method according to claim 17, further comprising:
   determining a displacement vector field in the region to be stitched that indicates a difference in position between corresponding pixels in different sub-images;
   calculating the curve using the displacement vector field.

20. The method according to claim 19, wherein the curve is calculated using a least cost optimization technique.

21. The method according to claim 20, wherein the curve is configured to avoid regions in which the displacement vectors are relatively large.

22. The method according to claim 1, further comprising determining a pixel value of the pixel at the interpolation position in the region to be stitched by weighting the pixel values of the corresponding pixels associated with that interpolation position using further weighting factors.

23. The method according to claim 22, wherein the further weighting factors are identical to the weighting factors.

24. A device for stitching a plurality of globally aligned sub-images in a region to be stitched, comprising:
   a memory for holding said plurality of sub-images;
   a stitching region determining unit to determine the region to be stitched; and
   a processor configured to construct a final image using the plurality of sub-images, said constructing comprising performing the method as defined in claim 1 to stitch the sub-images in the region to be stitched.

25. A non-transitory computer readable storage medium comprising instructions that, when run on a processor, instruct this processor to perform the method as described in claim 1.

* * * * *